(12) United States Patent
Santoriello et al.

(10) Patent No.: US 6,508,699 B1
(45) Date of Patent: Jan. 21, 2003

(54) APPARATUS FOR RINSING AND SCRAPING BI-VALVE MOLLUSKS

(76) Inventors: Frank J Santoriello, 619 Elwood Rd., East Northport, NY (US) 11731; Richard Santoriello, 213 Terrace Rd., Bay Port, NY (US) 11705

( * ) Notice: Subject to any disclaimer, the term of this patent is extended or adjusted under 35 U.S.C. 154(b) by 0 days.

(21) Appl. No.: 09/956,643

(22) Filed: Sep. 20, 2001

(51) Int. Cl.$^7$ ............................................. A22C 25/02
(52) U.S. Cl. ........................... 452/99; 452/12; 452/173
(58) Field of Search ........................ 452/12, 173, 198, 452/99, 106

(56) References Cited

U.S. PATENT DOCUMENTS

| | | |
|---|---|---|
| 71,434 A | 11/1867 | White |
| 477,134 A | 6/1892 | Macqueen |
| 989,072 A | 4/1911 | Solomon |
| 1,210,959 A * | 1/1917 | Luer ........................... 452/123 |
| 1,383,162 A * | 6/1921 | Sprague ........................ 452/99 |
| 2,331,855 A * | 10/1943 | Vucassovich ................. 452/99 |
| 2,640,223 A * | 6/1953 | Secor ........................... 452/12 |
| 2,808,612 A * | 10/1957 | Snow ........................... 452/12 |
| 2,860,371 A * | 11/1958 | Krull ............................ 452/99 |
| 3,095,601 A | 7/1963 | Wier, Sr. |
| 3,238,560 A * | 3/1966 | Jurisich ....................... 452/173 |
| 3,304,574 A * | 2/1967 | Ham et al. .................... 452/99 |
| 3,766,605 A * | 10/1973 | Burns ........................... 452/99 |
| 4,324,020 A | 4/1982 | Garwin et al. |
| 4,726,095 A | 2/1988 | Bissell, Jr. et al. |
| 4,839,942 A * | 6/1989 | Damp ........................... 452/99 |
| 4,875,255 A | 10/1989 | Kent, Jr. |
| 4,939,814 A | 7/1990 | Tillion |
| 4,945,608 A | 8/1990 | Majure et al. |
| D366,594 S * | 1/1996 | Ousley .......................... 452/99 |
| 5,534,893 A * | 7/1996 | Jameson ...................... 209/164 |
| 5,989,117 A | 11/1999 | Lin |
| 6,010,397 A | 1/2000 | Adams et al. |

FOREIGN PATENT DOCUMENTS

| | | | |
|---|---|---|---|
| FR | 2553623 | 4/1985 | |
| FR | 2638943 A1 * | 5/1990 | .................. 452/12 |
| IT | 0 580 238 A1 * | 1/1994 | .................. 452/12 |
| JP | 03133331 A * | 6/1991 | .................. 452/12 |

* cited by examiner

*Primary Examiner*—Peter M. Poon
*Assistant Examiner*—Joan M. Olszewski
(74) *Attorney, Agent, or Firm*—Michael I. Kroll (57) ABSTRACT

An apparatus for mechanically rinsing and scraping bi-valve mollusks and the like. The mollusks are placed into a perforated drum that is rotated by a motor, the drum having a plurality of agitation protrusions for churning, lifting and dropping the mollusks so they become frictionally engaged with one another and the plurality of abrasive elements contained therein thereby effectively scraping off any barnacles or other like debris. Jet streams of water are emitted to shower the mollusks during operation and a housing assembly that maintains the perforated drum therein also forms a basin that retains the effluence and creates an agitating, churning bath to facilitate cleaning. The front panel of the housing assembly is hinged to a bottom plate thereof and has two perpendicular side panels extending therefrom to form a chute for unloading the mollusks in an orderly manner into a bucket or other like container.

6 Claims, 8 Drawing Sheets

APPARATUS FOR RINSING AND SCRAPING BI-VALVE MOLLUSKS

BACKGROUND OF THE INVENTION

1. Field of the Invention

The present invention relates generally to mollusk cleaning devices, and more specifically, to an apparatus for mechanically rinsing and scraping bi-valve mollusks and the like wherein the mollusks are placed into a horizontally mounted perforated drum which has abrasive members and protuberances located therein against which the inserted mollusks are thrown and scraped during the axial rotation of the drum as initiated by a motor. The drum is maintained in a housing that introduces pressurized fluid into the drum and the water accumulates in a basin underneath formed by the housing in such a manner that a portion of the drum below the axle is submerged during operation thereby bathing and rinsing the mollusks rotating therein.

The present invention is designed preferably for cleaning mussels but works effectively with other bi-valve mollusks and other applications that benefit from a bathing process that includes abrasive scraping. Mussels are normally hand cleaned and require laborious wire brushing or scraping to remove barnacles and the tough tentacles by which the mussels or other bi-valves anchor onto rocks, pilings and other such objects along the shoreline, The present invention provides a self-contained unit for simultaneously washing and scraping a multiplicity of mollusks by tumbling them in a drum with abrasive members located therein as streams of water are applied thereto thus reducing the time and labor required to prepare the product for the market or the kitchen.

2. Description of the Prior Art

There are other shellfish cleaning devices. Typical of these is U.S. Pat. No. 71,434 issued to White on Nov. 26, 1867.

Another patent was issued to MacQueen on Jun. 14, 1892, as U.S. Pat. No. 477,134. Yet another U.S. Pat. No. 989,072 was issued to Solomon on Apr. 11, 1911 and still yet another was issued on Jul. 2, 1963 to Wier as U.S. Pat. No. 3,095,601.

Another patent was issued to Garwin et al. on Apr. 13, 1982 as U.S. Pat. No. 4,324,020. Yet another U.S. Pat. No. 4,726,095 was issued to Bissell, Jr. et al. on Feb. 23, 1988. Another was issued to Kent, Jr. on Oct. 24, 1989 as U.S. Pat. No. 4,875,255 and still yet another was issued on Jul. 10, 1990 to Tillion as U.S. Pat. No. 4,939,814.

Another patent was issued to Majure et al. on Aug. 7, 1990 as U.S. Pat. No. 4,945,608. Yet another U.S. Pat. No. 5,989,117 was issued to Lin on Nov. 23, 1999. Another was issued to Adams et al. on Jan. 4, 2000 as U.S. Pat. No. 6,010,397 and still yet another was issued on Apr. 26, 1985 to Besnard as French Patent No. FR2553623.

U.S. Pat. No. 71,434

Inventor: Napoleon Bonaparte White

Issued: Nov. 26, 1867

A hollow cylinder provided with blades or their equivalents, projecting inwardly from its circumference or sides, when made to revolve and otherwise adapted for the purpose of removing the scales from fish, substantially as herein set forth.

U.S. Pat. No. 477,134

Inventor: William N. MacQueen

Issued: Jun. 14, 1892

An apparatus of the class described, a revoluble turn-table having a series of water-receiving tubs mounted at intervals thereon and removable perforated cylinders mounted in the tubs, substantially as specified.

U.S. Pat. No. 989,072

Inventor: John I. Solomon

Issued: Apr. 11, 1911

A process of extracting pearls from pearl-bearing mussels, oysters or other pearl-bearing shell-fish, which consists in impelling the pearl-bearing meat against a sub-dividing or disintegrating structure.

U.S. Pat. No. 3,095,601

Inventor: Harvey J. Wier, Sr.

Issued: Jul. 2, 1963

A device for cleaning fish adapted to be towed behind a boat; an elongated hollow cylindrical container having a perforated wall and end closures; a plurality of blade members extending angularly inwardly of the wall arranged to contact fish placed in said container to remove the scales therefrom as the container rotates in the water as it is being towed behind a boat.

U.S. Pat. No. 4,324,020

Inventor: Richard L. Garwin et al.

Issued: Apr. 13, 1982

Apparatus for cleaning mussels and other shellfish which can be used floating on the surface of the water from which the shellfish were taken is disclosed. A container, typically a 5-gallon can, has a great number of holes formed in its circumferential surface. The container is supported within a basin of water, typically on a body of water by a pair of bouyant rings, so that a portion of the container lies below the surface of the water thereby allowing the water to enter and exit the container through the holes in the surface of the container. A door is provided in the container for the insertion and removal of the mussels. The interior surface of the container is interrupted, typically by a plurality of vanes or ribs formed on the interior surface of the container, so that when the container is rotated, typically by a hand crank attached to one end of the container, the mussels are drawn part way up the side of the container before tumbling back upon themselves. This mutual abrading action between the shellfish, as well as the abrading action between the container and the shellfish, causes the attached sand, seaweed, and other debris to become loosened from the mussels. The loosened debris is simultaneously washed out through the holes in the container back into the water. The basin of water, in addition to supporting the container in the preferred embodiment, provide a constant source of clean water with which to rinse the shellfish as they are being cleaned.

U.S. Pat. No. 4,726,095

Inventor: Norman L. Bissell, Jr. et al.

Issued: Jun. 23 1970

The specification discloses a portable fish scaling device which is simple and easily used and cleaned. The device includes a water-tight bucket, an abrasive continuous surface within the bucket, and an agitator for agitating water within the bucket. As the water is agitated, fish suspended within the water gently tumble against the abrasive surface and are thereby scaled. Preferably, the abrasive surface is an inwardly dimpled bucket liner; and the agitator is a rotatable impeller.

U.S. Pat. No. 4,875,255

Inventor: George W. Kent Jr.

Issued: Oct. 24, 1989

A fish scaling apparatus and process is disclosed wherein a vertical stand 11 supports a pair of elongated, concentrically spaced, perforated drums 20,22 (FIGS. 1–7). An access door 23 is provided along the length of the outer drum 20 to permit loading and unloading of a quantity of fish in the space d between the two drums. Drums 20,22 are provided, respectively, with a plurality of dimpled perforations 25,26 through the sidewall thereof with each perforation having rough edges facing toward the space between the drums (FIG. 3*a*). A perforate water pipe 13 serves as an axle about which the drums 20,22 rotate and an electric motor 40, in conjunction with a selection of pulleys, (FIGS. 1–2), chain and sprocket wheels (FIG. 5), and/or gears (FIG. 10), supply the rotative force for the drums. Drums 20,22 are designed to rotate together (FIGS. 1–7), separately (FIGS. 8–9), or in opposite directions (FIG. 10). Rotation of one or both drums causes the fish therebetween to engage the rough edge perforations 25,26 and the scraping movement thereover effects removal of the fish scales. Most of the removed scales pass through the outer drum perforations 25 and are collected on a screen grid 39 disposed over drain 29 and within a removable drip pan 28 that is releasably supported by the stand (FIG. 4).

U.S. Pat. No. 4,939,814

Inventor: Diana R. Tillion

Issued: Jul. 10, 1990

A cultured mussel cleaning machine (10) for cleaning fragile-shelled mussels, the machine (10) having a first staged (12) and a second stage (14). The first stage (12) includes a cylindrical container (16) in which is mounted a series of rotating chains (48) and flexible, abrasive gloves (56) that break apart and clean mussels (70) as they move from a loading chute (34) to a drain (72) by the force of pressurized water (68). Mussels (70) exiting the first stage (12) enter the second stage (14) where they travel down an inclined series of abrasive rollers (106). The mussels (70) are gently pressed against the abrasive rollers (106) by compressible material (112) formed on the underside (110) of a lid (84) placed over the rollers (106). The cleaned mussels (70) pass over a second drain (116) and into a container (120). The second stage (14) is detachable from the first stage (12) for remote operation where the rollers (106) are powered by a manual crank (134).

U.S. Pat. No. 4,945,608

Inventor: James Majure et al.

Issued: Aug. 7, 1990

A device for scaling of fish is disclosed which includes a hollow, rotatable drum provided with a plurality of spike elements arranged in a predetermined pattern or array about the entire circumferential surface of the drum, and projecting radially inwardly, generally toward the center axis of the drum. The drum is mounted for rotation by a perforated shaft, coincident with the center axis of the drum, the shaft also serving to supply liquid to the interior of the drum for washing the fish and for removing scales from the drum. A drainage pan is located beneath the drum and includes support elements for the drum and for motor means which rotates the drum.

U.S. Pat. No. 5,989,117

Inventor: Kuei-Chou Lin

Issued: Nov. 23, 1999

A shellfish wash device has a main platform, a wash tank disposed on the main platform, a tubular flow device disposed in the wash tank, a power source disposed beneath the wash tank, a main disk disposed in the tubular flow device, and a rotating cap disposed on the main disk. The power source has a motor, a first bevel gear, a pivot connected to the motor and the first bevel gear, a second bevel gear, engaging with the first bevel gear, a shaft connected to the second bevel gear, and a distal portion of the shaft passing through a center of the wash tank, a center of the tubular flow device and a center of the main disk. An end of the shaft is inserted in the rotating cap.

U.S. Pat. No. 6,010,397

Inventor: Thomas Mayne Adams et al.

Issued: Jan. 4, 2000

A method of processing bivalve molluscs comprises filling a basket-like container (11) with the bivalve molluscs and vibrating the bivalve molluscs within the container (11), thereby inducing them to close tightly under stress and compacting them together. A lid (12) is closed to maintain the compact configuration of the bivalve molluscs, which are cooked by immersing the container into boiling seawater, before being removed and plunged into chilled water to halt the cooking process. The bivalve molluscs are then blast frozen. Because the shells of the bivalve molluscs are tightly closed and better compaction is achieved by vibrating the bivalve molluscs than by compressing them into the container (11), the shells are unable to open and the internal juices are retained within the shells throughout the cooking, chilling and freezing steps, thereby resulting in processed bivalve molluscs having greatly improved organoleptic qualities upon thawing.

French Patent Number FR2553623

Inventor: G. Besnard

Issued: Apr. 26, 1985

The invention relates to a device for declumping mussels or other shellfish and it consists of a frame 2 on which the rotary brushes 1 are fixed. The hopper 3 is intended for receiving the mussels which are transported on the metal belt 4. The deflectors 5 are intended for guiding the mussels during their passage under the brushes.

While these shellfish cleaning devices may be suitable for the purposes for which they were designed, they would not be as suitable for the purposes of the present invention, as hereinafter described.

SUMMARY OF THE PRESENT INVENTION

A primary object of the present invention is to provide an apparatus for mechanically rinsing and scraping bi-valve mollusks as they tumble within a horizontally mounted rotating drum that has a plurality of abrasive members and protrusions situated therein.

an additional object of the present invention is to provide an apparatus for mechanically rinsing and scraping mollusks having a means to introduce a plurality of jet sprays to rinse the mollusks as they tumble within the drum.

A further object of the present invention is to provide an apparatus for mechanically rinsing and scraping mollusks wherein the drum is axially mounted to a housing that forms a basin that maintains a lower portion of the drum submerged beneath the accumulated water from the jet sprays.

A yet further object of the present invention is to provide an apparatus for mechanically rinsing and scraping mollusks wherein the drum is comprised of abrasive material hereon referred to generally and collectively as abrasive elements and has a plurality of spaced protuberances therein to provide a rotative combing action for moving the mollusks in such a manner that they are lifted and dropped to enhance the scraping action as they are thrown against one another and the abrasive elements during operation thereof.

Still another object of the invention is to provide an apparatus for mechanically rinsing and scraping mollusks wherein the axial rotation of the drum is induced by a motor, said motor could be electrically or gasoline powered.

One more object of the present invention is to provide an apparatus for mechanically rinsing and scraping mollusks that is simple and easy to use.

A further object of the present invention is to provide an apparatus for mechanically rinsing and scraping mollusks that is economical in cost to manufacture.

Further objects of the present invention will appear as the description proceeds.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the track mounting system of the present invention. With regard to the reference numerals used, the following numbering is used throughout the various drawing figures.

10 apparatus for rinsing and scraping mollusks
12 housing assembly
14 perforated drum
16 drum rotating means
18 fluid introduction means
20 material unloading means
21 drum access door
22 abrasive elements
24 agitation protrusions
26 baseplate of 12
28 first sidewall of 12
30 second sidewall of 12
32 rear wall of 12
34 chute door
36 front plate of 34
38 first side panel of 34
40 second side panel of 34
42 top plate of 12
44 drain assembly
46 loading port
48 axle
50 motor
52 mollusks
54 axle gear
56 drive gear
58 chain belt
60 hose adapter
62 conduit
68 external water source
70 pressurizing recesses
72 pressurized jetstreams
74 hinge
76 flexible sheet
78 operator

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Figure 1:
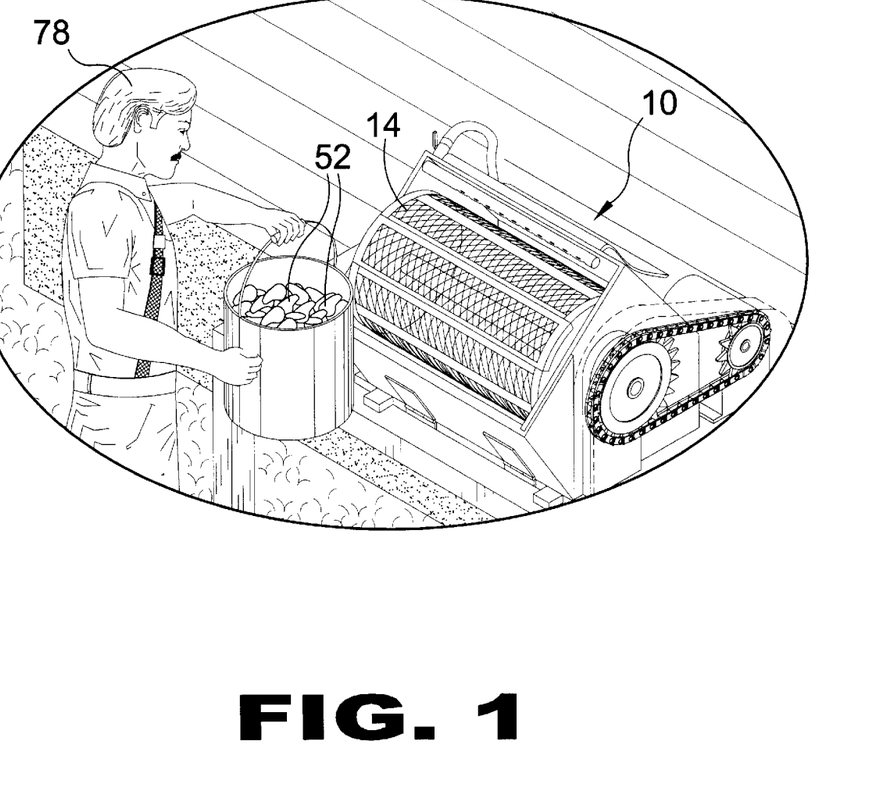
FIG. 1 is a perspective view of the present invention in use.
Figure 2:
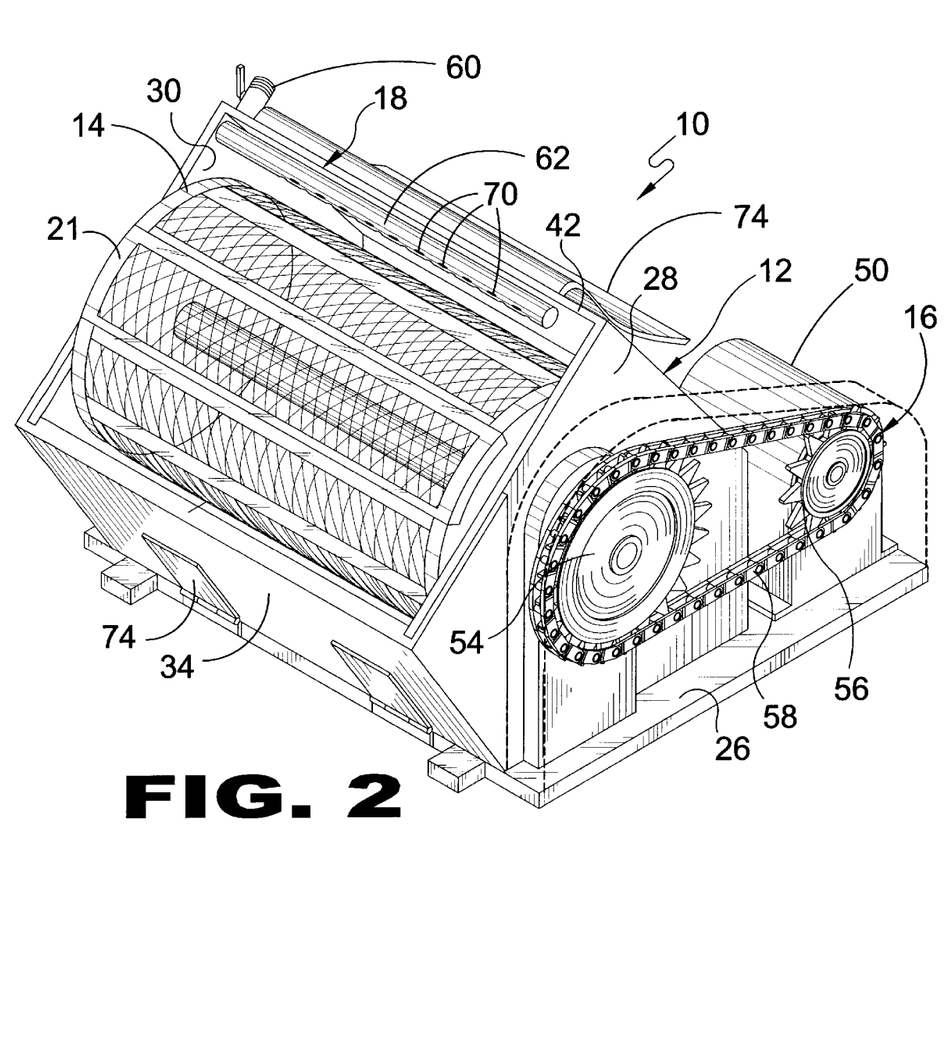
FIG. 2 is a perspective view of the present invention.
Figure 3:
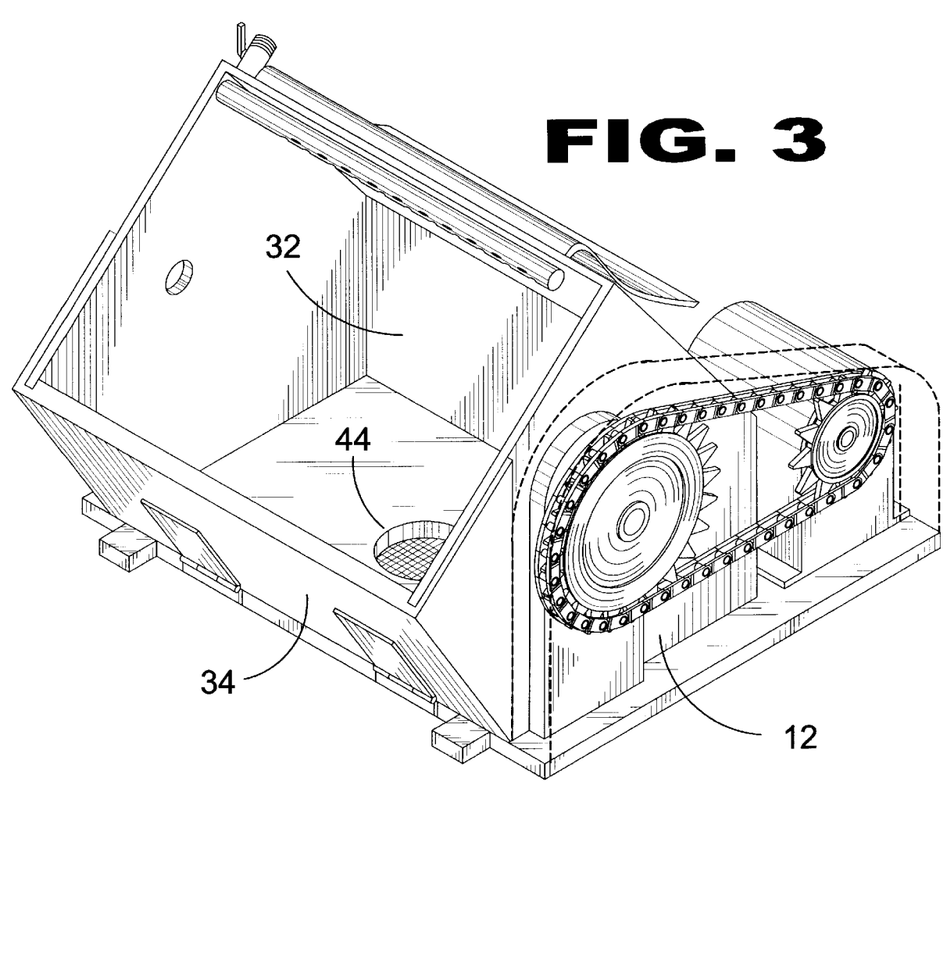
FIG. 3 is a perspective view of the present invention with the drum and axle removed.

The present invention shown in FIG. 1 is an apparatus for rinsing and scraping mollusks 52 wherein an operator 78 is preparing to clean a plurality of mollusks 52 by placing them in the perforated drum 14 where they will be abrasively tumbled and rinsed therein. FIG. 2 is an enlarged perspective view of the present invention 10 with the flexible sheet 74 thrown back out of the way to reveal the perforated drum 14 and the water conduit 62. The drum access door 21 is secured in place on the perforated drum 14. The perforated drum 14 is maintained within a housing assembly 12 that comprises a baseplate 26, a first sidewall 28, a second sidewall 30, a rear wall 32 as shown in FIG. 3, a top plate 42 a chute door 34 secured to said baseplate 26 by hinges 74. A drum rotating means 16 is initiated once the mollusks 52 are secured in the perforated drum 14 thereby rotating the perforated drum 14 and its contents. The drum rotating means 16 shown in the drawing figures is a motor 50 turning a drive gear 56 which acts upon a chain belt 58 which rotates an axle gear 54 integral with the perforated drum 14 thus resulting in its rotation. A fluid introduction means 18 is attached to the top plate 42 and comprises a hose adapter 60 to receive an water from an external water supply 68 and a horizontal conduit 62 with a plurality of pressurizing recesses 70 oriented to spray water into the inner region of the perforated drum 14 thereby effectively rinsing any material contained therein.

FIG. 3 is a perspective view of the housing assembly 12 with the perforated drum 14 removed to reveal rear wall 32 and the drain assembly 44 in the baseplate 26.

Figure 4:
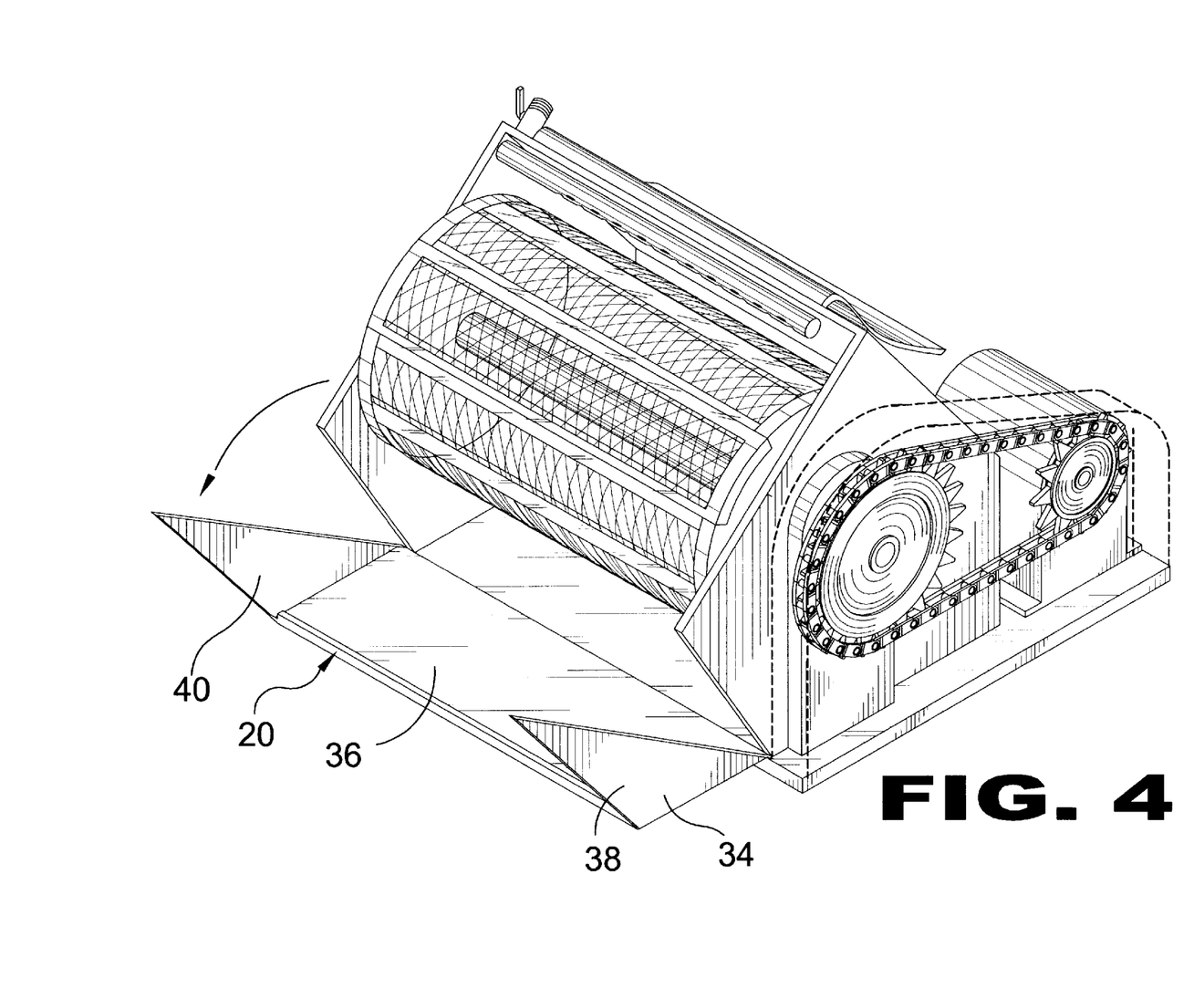
FIG. 4 is a perspective view of the present invention with the door open.

The chute door 34 is open in FIG. 4 showing the front plate 36 in a substantially horizontal position and the integral first side panel 38 and second side panel 40 extending perpendicularly therefrom forming material unloading means 20 that will allow an operator 78 to open the access door 21 and pour the mollusks 52 onto the front plate 36 and guide them into a bucket or other like container while the first side panel 38 and the second side panel 40 prevent the mollusks 52 from falling to the side during dumping.

Figure 5:
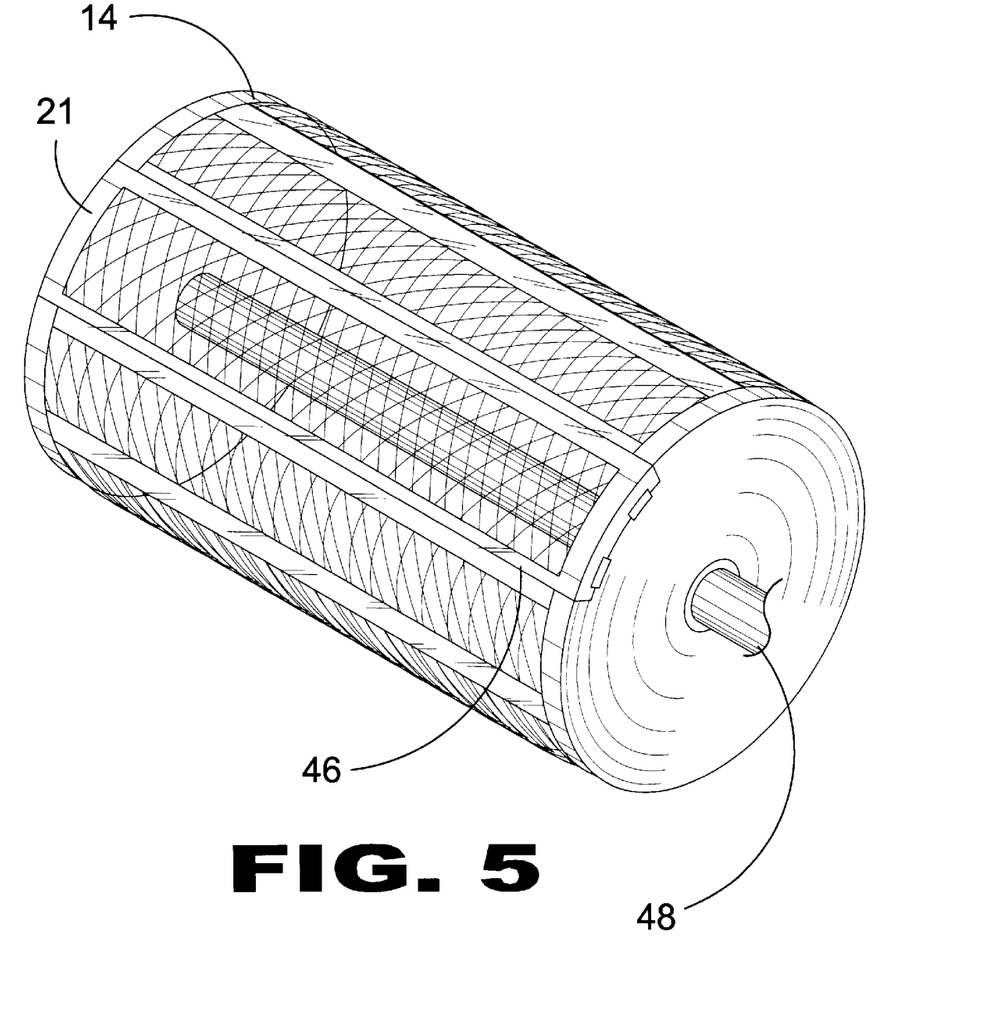
FIG. 5 is a perspective view of the drum and axle assembly.
Figure 6:
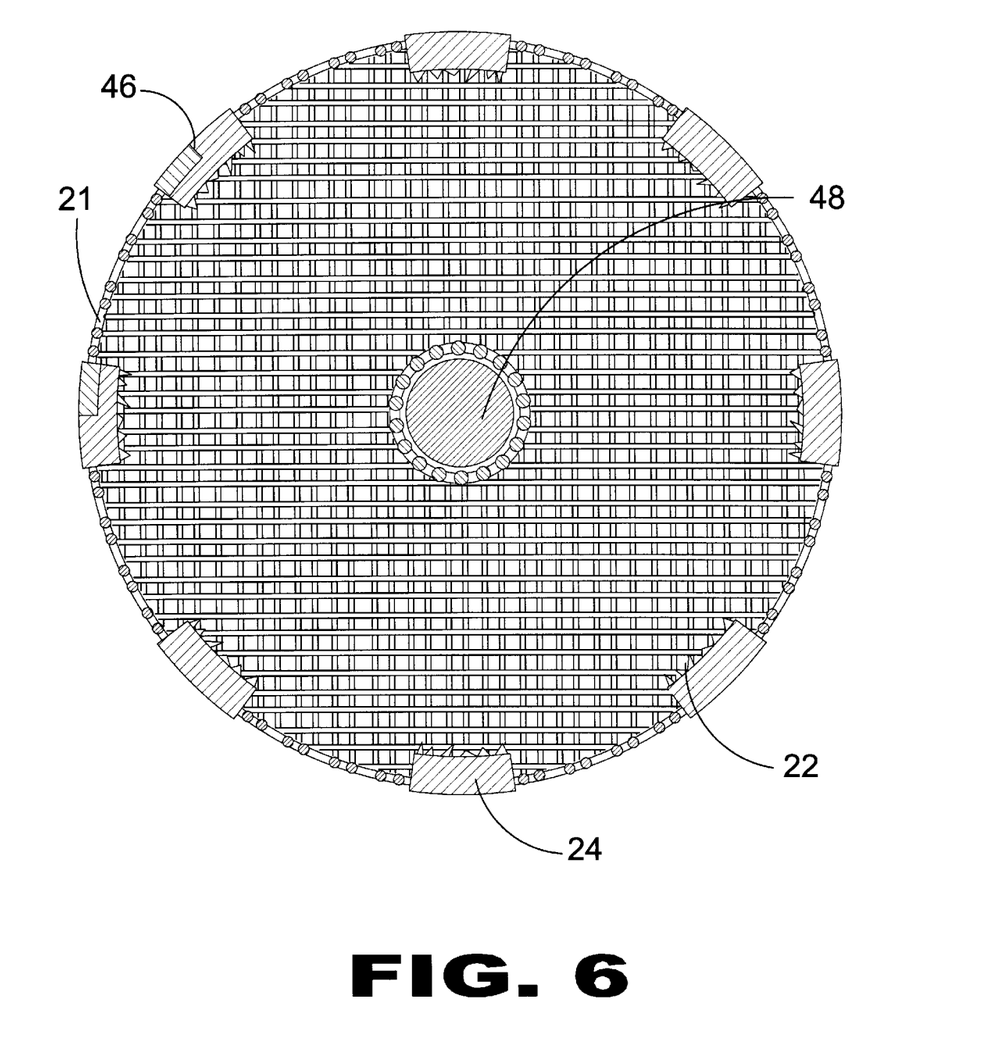
FIG. 6 is a cross sectional side view of the drum and basket assembly.
Figure 7:
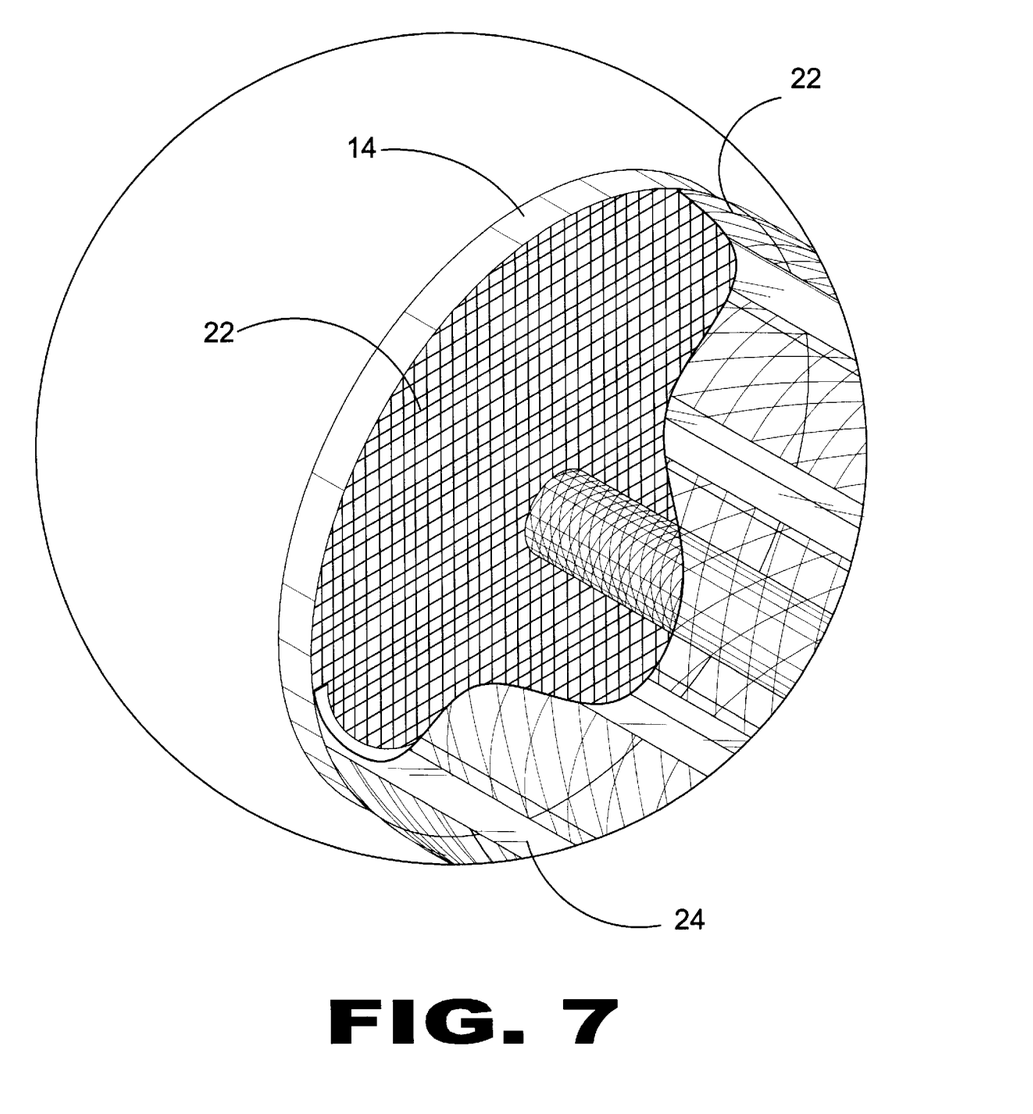
FIG. 7 is a partial sectional view of the drum and axle assembly.

FIG. 5 is a perspective view of the perforated drum 14 removed from the housing assembly 12 and FIG. 7 is an enlarged view of the perforated drum 14 with the access door 21 in place over the loading port 46 and the axle 48 covered with an abrasive element 22 which is also demonstrated in the cross sectional side view of the perforated drum 14, the axle 48 and the plurality of agitation protrusions 24 and their abrasive elements 22 which extend longitudinally through said perforated drum 14.

Figure 8:
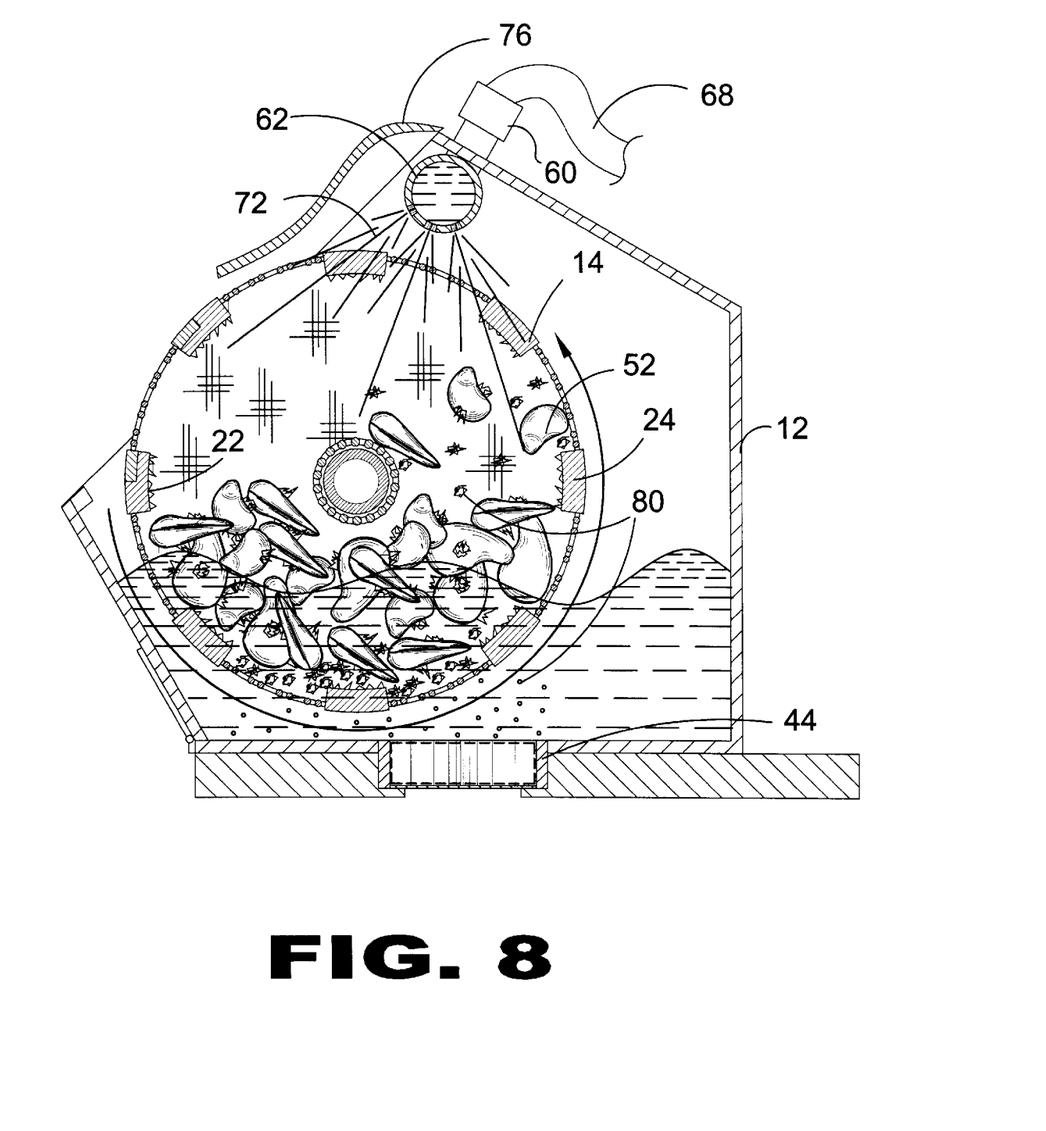
FIG. 8 is a cross-sectional side view of the present invention in use.

FIG. 8 is a cross sectional side view of the present invention 10 in use showing a plurality of mollusks 52 inside the rotating perforated drum 14 and being churned and lifted by the agitation protrusions 24 and scraped by the various abrasive elements 22 which remove debris 80 such as barnacles and the like therefrom. Pressurized water from an external water source 68 is introduced to the conduit 62 via a hose adapter 60 where it is further pressurized by a plurality of pressurizing recesses 70 that emit pressurized jetstreams 72 over the contents of the perforated drum 14 to shower the mollusks 52 being agitated therein. The effluence serves to soak and bathe the mollusks within the housing assembly 12 until such time that the operator 78 opens the drain assembly 44 to remove the effluence therefrom. The flexible sheet 76 rests on the rotating perforated drum 14 so as to contain any overspray within the housing assembly 12.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. An apparatus for rinsing and scraping mollusks comprising:
   a) a housing assembly including:
      i) a baseplate;
      ii) a first sidewall;
      iii) a second sidewall;
      iv) a rear wall; and
      v) a chute door pivotably connected to said baseplate by a hinge, said chute door acts as dump chute for controlling the removal of mollusks therefrom when in the open position and when closed forms a watertight seal and conjunctively with said baseplate, said first sidewall, said second sidewall, and said rear wall defines a basin
   b) a perforated drum horizontally mounted within said housing for maintaining and abrasively churning and tossing the material therein during operation;
   c) means for axially rotating said drum within said housing;
   d) means for introducing a pressurized fluid into said drum and onto its respective contents;
   e) abrasive elements within said drum; and
   f) a plurality of agitation protrusions extending longitudinally and projecting medially from the inner peripheral wall of said drum to abrasively lift, drop and churn material placed therein;
   g) a top plate extending angularly and centrally from the top of said rear wall and connected on one side by said first sidewall and on the other side by said second sidewall; and
   h) a flexible sheet fastened to the top edge of said top plate for retaining the overspray and splashback from said fluid introduction means.

2. An apparatus for rinsing and scraping mollusks as recited in claim 1, wherein said drum is substantially cylindrical with a plurality of perforations large enough to permit fluid and abraded debris to travel freely therethrough and small enough to retain mollusks therein, said drum being rotatably mounted on a horizontal plane within said housing.

3. An apparatus for rinsing and cleaning mollusks as recited in claim 2, wherein said drum further comprises:
   a) a selectively securable drum access door covering a recess in a longitudinal section of said drum hereinafter referred to as the loading port, wherein said access door is adapted to pivot peripherally away from said drum to allow for the insertion or removal of material therein; and
   b) an integral axle being a rod extending centrally through said drum and beyond each end thereof, said axle having abrasive elements on the surface.

4. An apparatus for rinsing and scraping mollusks as recited in claim 3, wherein said drum rotating means comprises a motor mounted on said housing assembly and means for communicating with said axle.

5. An apparatus for rinsing and scraping mollusks as recited in claim 4, wherein said communicating means comprises:

a) an axle gear engaged with said axle;

b) a drive gear engaged with said motor; and c) a chain belt communicating with said axle gear and said drive gear in such a manner that the axial rotation of the drive gear will encourage the axial rotation of the axle gear thereby rotating said perforated drum.

6. An apparatus for rinsing and scraping mollusks as recited in claim 1, wherein said fluid introduction means comprises:

a) an adapter for connecting an external water source, preferably a garden hose;

b) a conduit with a tubular sidewall defining a fluid distribution channel, said conduit being longitudinally parallel with said perforated drum and connected with said hose adapter; and c) a plurality of pressurizing recesses within said sidewall of said conduit directed towards a central portion of said perforated drum thereby enabling said conduit to deliver a plurality of pressurized jetstreams into the interior of said perforated drum and over the contents therein.

* * * * *